Jan. 13, 1925.　　　　　　　　　　　　　　　　1,522,795
F. S. VAN VALKENBURG
METHOD OF MAKING RUBBER ARTICLES AND THE LIKE
Filed March 23, 1923　　2 Sheets-Sheet 1
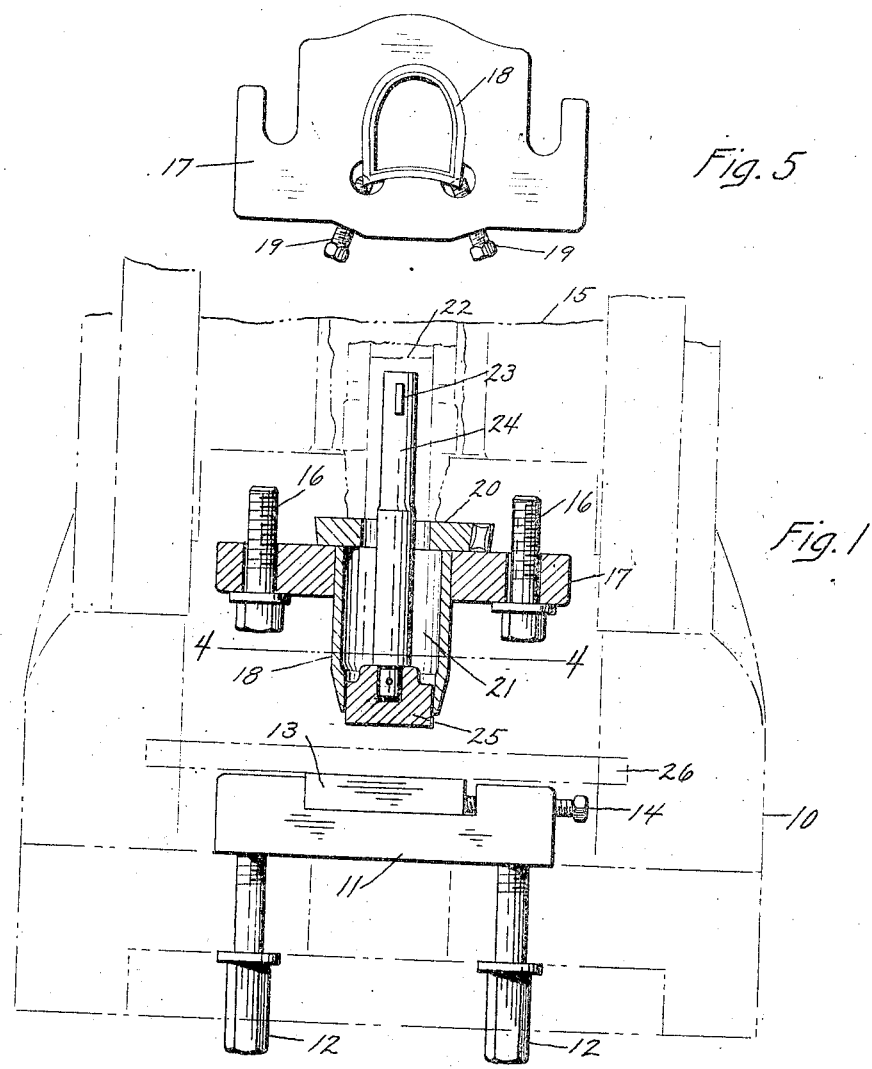

Jan. 13, 1925.　　　　　　　　　　　　　　　　1,522,795
F. S. VAN VALKENBURG
METHOD OF MAKING RUBBER ARTICLES AND THE LIKE
Filed March 23, 1923　　2 Sheets-Sheet 2

Inventor
Fred S. Van Valkenburg
By George E. Hall
Atty.

Patented Jan. 13, 1925.

1,522,795

UNITED STATES PATENT OFFICE.

FRED S. VAN VALKENBURG, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METHOD OF MAKING RUBBER ARTICLES AND THE LIKE.

Application filed March 23, 1923. Serial No. 627,077.

*To all whom it may concern:*

Be it known that I, FRED S. VAN VALKENBURG, a citizen of the United States, residing at Waterbury, in the county of New Haven and State of Connecticut, have invented certain new and useful Improvements in Methods of Making Rubber Articles and the like, of which the following is a specification, reference being had therein to the accompanying drawings.

This invention relates to means and method of making rubber articles or the like and it is the principal object thereof to cut and it is the principal object thereof to cut slugs or other articles from sheets of rubber or plastic material, more rapidly and economically than has been possible by the known means and method.

Among other aims and objects of the invention may be recited the provision of means wherein the number of parts are few, the construction simple, the cost of production small, and in their operation require the minimum skill and labor.

The arrangement of the parts in my improved means, and their method of operation, will be apparent from an inspection of the accompanying drawings, in connection with the description hereinafter contained, and wherein a preferred embodiment of the invention is disclosed for the purpose of imparting an understanding of the same.

In the drawings, wherein like numerals of reference designate like parts in the several figures;

Fig. 1 is a front elevation, partly in section, of the tools utilized in my invention with the outline of the frame of a machine with which they are connected outlined in broken lines;

Fig. 5 is a plan view of the punch holder.

Figure 3:
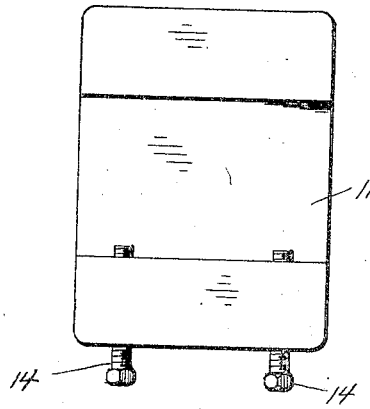
Fig. 3 is a plan of the bolster.
Figure 4:
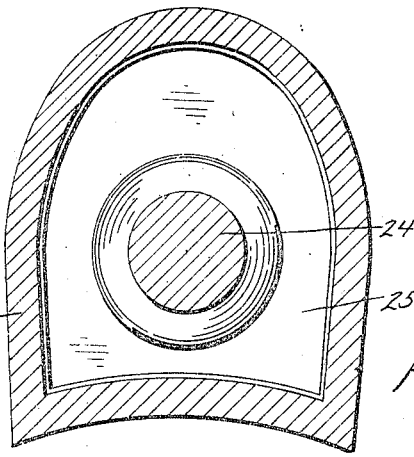
Fig. 4 is an enlarged sectional view of the parts taken generally upon line 4—4 of Fig. 1.
Figure 2:
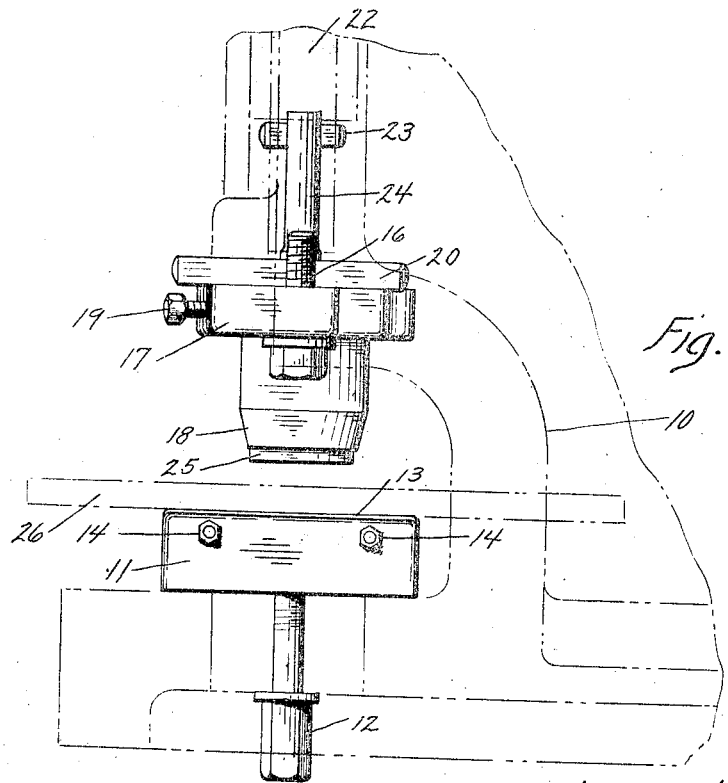
Fig. 2 is a front elevation thereof.

While the means and method herein shown are adapted for unlimited uses and purposes they will be described herein particularly as applied to the art of making rubber heels and the like.

Rubber heels or the like are manufactured from sheets of rubber that are of substantially the same thickness as the finished rubber heel. These sheets vary greatly in thickness at different points in the same sheet and relatively to other sheets. From these sheets, by means of a dinking tool, slugs are cut therefrom of substantially the same shape in cross section as the finished rubber heel, after which the slug is vulcanized in a mold. If the slug does not entirely fill the mold during the vulcanizing process an imperfect heel is produced. In practice it is practically impossible to cut slugs from these imperfect sheets that will have just sufficient rubber to fill the mold. Therefore they are usually cut with more rubber than is required to fill the mold, with the result that during the vulcanizing process the excess rubber overflows the mold and is wasted. As rubber in the manufacture of rubber heels, before being vulcanized is worth many times that of the overflow rubber after being vulcanized, it is therefore desirable that there should be the minimum overflow, if any, thus reducing the wastage of material and the cost of manufacture.

One of the common methods of preparing these slugs so that they will be nearly uniform in their cubic contents is by weighing. A slug of the exact weight is placed in one tray of a balance scale, and then each slug as first cut from the sheets of rubber is placed in the other tray of the scale. If, as is usually the case, because they are so prepared, the new slug is heavier than required, a small portion of the slug is cut therefrom and the weight thereof again tested. This operation is continued until the slug is substantially the same weight as the test slug. Obviously this is a laborious, expensive and uncertain process. However, even with this imperfect method the amount of overflow rubber from the vulcanizing mold is excessive. With my improved means and method all of the slugs are cut with substantially the same cubic contents and placed in the vulcanizing mold without experimentation as to weight or volume of rubber therein. There is therefore no excess of rubber from the vulcanizing mold, resulting in a saving of both labor and material over the present methods.

The tools utilized in this new and improved means and method may, and as shown herein, are associated with a double acting press 10, outlined by broken lines. Upon the bed of this press a bolster 11 is secured by the screws 12 and within which is held a die or plate 13 by the screws 14.

Adjustably fixed in the gate 15 by the screws 16 is a punch holder 17, within which is secured the cutting punch 18 by screws 19. The upper end of this cutting punch 18 contacts with a backing plate 20 fixed in the gate 15 adjacent to the punch holder 17. The cutting edge of the punch 18 is of substantially the same shape as the contour of the rubber heel and has an opening 21 therethrough. Fixed in the secondary gate 22 of the press by the key 23 or the like, is a punch shank 24 having on the lower end a pressure punch 25, the outer edge of which is substantially the same shape as that of the rubber heel and the cutting edge of the punch 18. These tools, of course, may vary in shape and construction and may be associated with other types of machines than a double-acting press within the spirit of my invention.

In operation the sheet of rubber 26, shown by broken lines in Fig. 1, is placed over the die 13, after which the pressure punch 25 moves downwardly onto the top thereof and holds it rigid and under pressure. The cutting punch 18 then descends and cuts a slug or blank therefrom. The cutting punch now moves upwardly until its cutting edge is above the top of the sheet, when the pressure punch is lifted and the slug, in its complete form, is ready for vulcanizing. As a result thereof that portion of the rubber sheet between the die and pressure punch is always of substantially the same cubic content, the resiliency of the rubber permitting the excess rubber, if any, to be forced away from the pressure punch, and while so held the slug or blank is cut therefrom.

The slugs are cut so that the cubic content thereof is exactly the same as that of the vulcanizing mold. In some cases, however, it might be desirable to have a slight excess of rubber, which result can be obtained by varying the pressure of the pressure punch upon the sheet of rubber.

There are minor changes and alterations that can be made within this invention, aside from those herein suggested, and I would therefore have it understood that I do not limit myself to the exact construction herein described but claim all that falls fairly within the spirit and scope of the appended claims.

Having described my invention, what I claim as new and desire to secure by Letters Patent, is:—

1. The hereindescribed method of cutting rubber heel blanks preparatory to molding thereof, which consists in subjecting an area of a sheet of rubber corresponding to the shape which the heel is to possess to predetermined pressure so as to compress such area to such degree to impart to same a cubic content substantially equal to that of the mold, and then in cutting the sheet at the margin of and while, said area thereof is maintained under said predetermined compression.

2. The hereindescribed method of cutting compressible material preparatory to molding thereof, which consists in subjecting the material to pressure throughout an area corresponding to that which the finished article is to possess so as to compress such area to a predetermined cubic content substantially equal to that of the mold, and then in cutting away the material exterior of such area and while the material is maintained under said predetermined compression.

In testimony whereof, I have hereunto affixed my signature.

FRED S. VAN VALKENBURG.